US005417394A

United States Patent [19]

Knorr et al.

[11] Patent Number: 5,417,394

[45] Date of Patent: May 23, 1995

[54] FASTENING DEVICE FOR HEATING PLATES OF A HEATING DEVICE OF A CORRUGATED BOARD PLANT

[75] Inventors: Andreas Knorr, Nuremberg; Uwe Panckow, Weiden; Dietmar Blaschke; Helmut Kliesch, both of Weiherhammer; Richard Kohl, Mantel; Hermann Fisser, Weiden, all of Germany

[73] Assignee: BHS Corrugated Maschinen— und Anlagenbau GmbH, Weiherhammer/Opf., Germany

[21] Appl. No.: 58,746

[22] Filed: May 7, 1993

[30] Foreign Application Priority Data

May 7, 1992 [DE] Germany ........................ 42 15 086.8

[51] Int. Cl.⁶ ........................ F16M 11/24

[52] U.S. Cl. ........................ 248/188.4; 156/208; 493/332

[58] Field of Search ........................ 493/332, 381, 463; 156/208, 270; 52/126.7; 248/188.4

[56] References Cited

U.S. PATENT DOCUMENTS

| | | | |
|---|---|---|---|
| 2,008,974 | 7/1935 | Weber | 493/332 X |
| 2,145,334 | 1/1939 | Bergstein | 493/332 |
| 2,423,870 | 7/1947 | Blessing | 156/208 X |
| 3,537,946 | 11/1970 | Truax | 493/332 X |
| 4,132,581 | 1/1979 | Swartz | 156/208 |
| 4,765,855 | 8/1988 | Geoffroy | 156/208 X |
| 4,937,989 | 7/1990 | Miyares | 52/126.7 |
| 5,213,560 | 5/1993 | Crowley | 493/332 X |
| 5,301,480 | 4/1994 | Oyama | 52/126.7 X |

FOREIGN PATENT DOCUMENTS

| | | | |
|---|---|---|---|
| 2213745 | 6/1974 | Germany . | |
| 2731411 | 1/1979 | Germany | 52/126.7 |
| 3744799 | 6/1989 | Germany . | |
| 2194974 | 3/1988 | United Kingdom | 156/208 |
| 1664581 | 7/1991 | U.S.S.R. . | |

OTHER PUBLICATIONS

* A brief English language synopsis is attached to each reference.

NEUE BEKLEBEMASCHINE THERMOPLAR dated Aug. 25, 1973 (5 pages) with an English translation of the article (7 pages) attached thereto.

*Primary Examiner*—J. Franklin Foss

*Attorney, Agent, or Firm*—Flynn, Thiel, Boutell & Tanis

[57] ABSTRACT

A fastening device for heating plates of a heating device of a corrugated board plant. Each heating plate is fastened on a form-stiff and fixed frame. The ends of the heating plates are supported by loose support devices. Thus, a flat heating surface for the strip of corrugated board guided over the heating surface is maintained even during a limited expansion of the heating plates due to the effect of heat.

9 Claims, 1 Drawing Sheet

FASTENING DEVICE FOR HEATING PLATES OF A HEATING DEVICE OF A CORRUGATED BOARD PLANT

FIELD OF THE INVENTION

The invention relates to a fastening device for heating plates of a heating device of a corrugated board plant.

BACKGROUND OF THE INVENTION

The heating plates in conventional heating devices for corrugated board plants are loosely stored on longitudinal carriers. Their upper sides form a flat, horizontal heating surface, over which the corrugated board strip, which is to be dried, is guided. These heating plates are heated, for example, by means of super-heated steam. Because of differences in the temperature between the upper side and the lower side, there exists the risk that the upper side and thus the heating surface of the heating plates will buckle. This will result in an uneven heating of the strip of corrugated board.

The basic purpose of the invention is to fasten the heating plates by means of a fastening device in such a manner that they can be adjusted to provide a flat, horizontal heating surface, the flat plane being maintained also upon expansion in axial direction due to the effects of heat.

The fastening device permits an easy adjustment of the upper side of the heating plate to achieve a flat, horizontal heating surface. Its design is relatively simple. In addition, the fastening device guarantees the demanded flatness of the heating surface also during expansion of the heating plates due to the effects of heat.

BRIEF DESCRIPTION OF THE DRAWINGS

The invention will be discussed hereinafter in greater detail in connection with one exemplary embodiment illustrated in the drawing in which.

DETAILED DESCRIPTION

Figure 1:
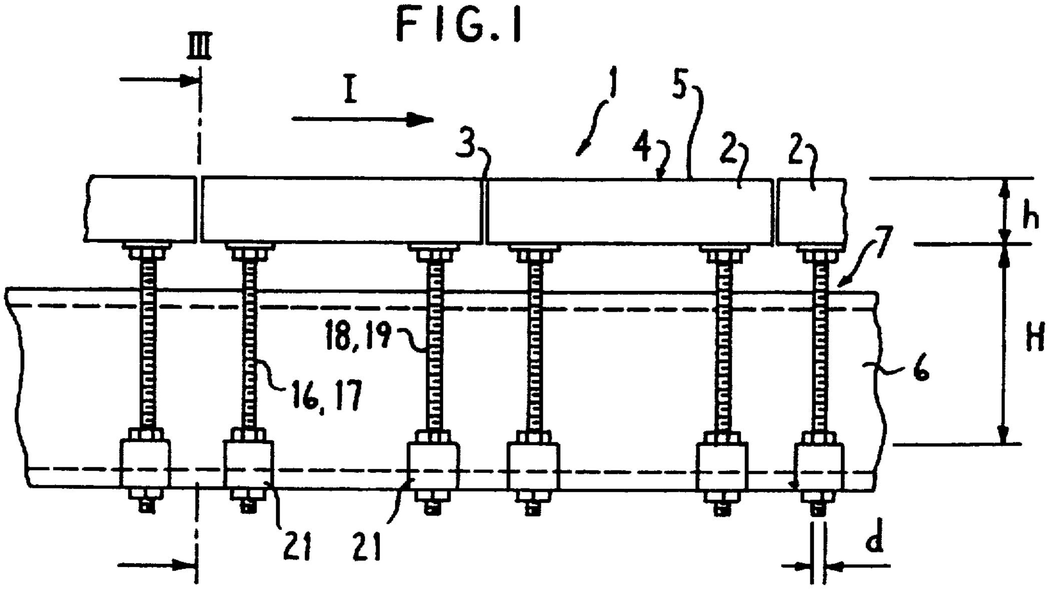
FIG. 1 is a partial side view of a heating device for a corrugated board plant with a fastening device for each heating plate.
Figure 2:
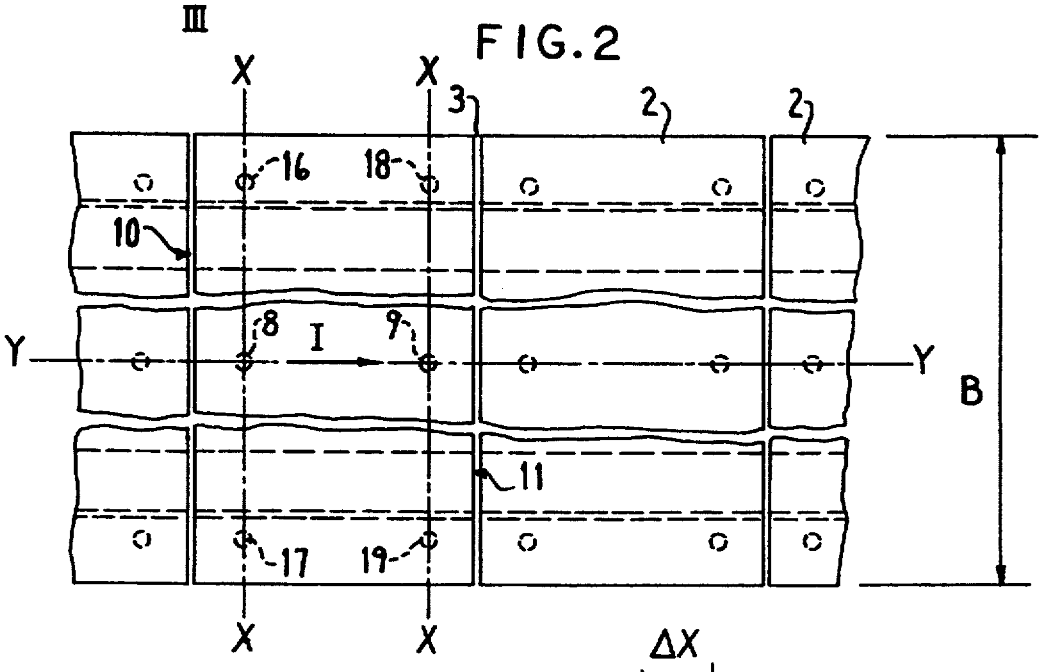
FIG. 2 is a partial top view.

The heating device 1 for a corrugated board plant consists as usual of several series arranged heating plates 2 which are arranged one behind the other with a spacing 3 in the direction of movement I of the strip of corrugated board (not illustrated). The heating plates can, for example, be heated with super-heated steam. Their dimension in the direction of movement I of the strip of corrugated board is considerably less than transversely thereto.

The heating plates 2 form with their upper sides 4 a heating surface 5 for the strip of corrugated board moving over the heating plates, which heating surface is flat and horizontally aligned.

A fastening device 7 is used to fasten the heating plates 2 to a bracket or holder 21 mounted on a fixed frame 6. This fastening device enables the upper sides 4 of the heating plates 2 to be aligned flat in a simple manner and permits an expansion of the heating plates 2 when they are heated up, however, while at the same time maintaining the heating surface 5 flat. The fastening device 7 consists of two fastening means 8, 9 located adjacent the longitudinal ends 10, 11 of the heating plates 2 facing the direction of movement I of the strip of corrugated board. The fastening means 8, 9 lie in a central longitudinal plane Y—Y.

These fastening means 8, 9 have a center, fixed frame carrier 12, for example in the form of a side opening U-shaped rail. One end of a short threaded rod 13 is fastened to one (upper) horizontally extending leg 15 of U-shaped rail. The other end of the threaded rod 13 is thereby fastened to the heating plate 2 and is secured thereto by means of a counter-nut. The other end of the threaded rod 13 is adjustably connected through nuts 14 to the leg 15 of the fixed frame carrier 12.

Fastening means 16, 17, 18 and 19 are provided in each carrier of the heating plate 2. The fastening means 16, 17 or 18, 19 lie thereby in common transversely extending planes X—X with respect to the plane Y—Y containing the fastening means 8 or 9. Long threaded rods 20 are for this purpose adjustably connected to the underside of the heating plate 2 and are secured in place by counter-nuts. The other end of the rod is connected to frame-fixed brackets or holders 21 by adjusting nuts 22.

It is possible with the threaded rods 13 and/or 20 and the adjusting nuts 14 and/or 22 to adjust the upper side 4 of the individual heating plates 2 into an aligned and coplanar position to define the heating surface 5.

Figure 3:
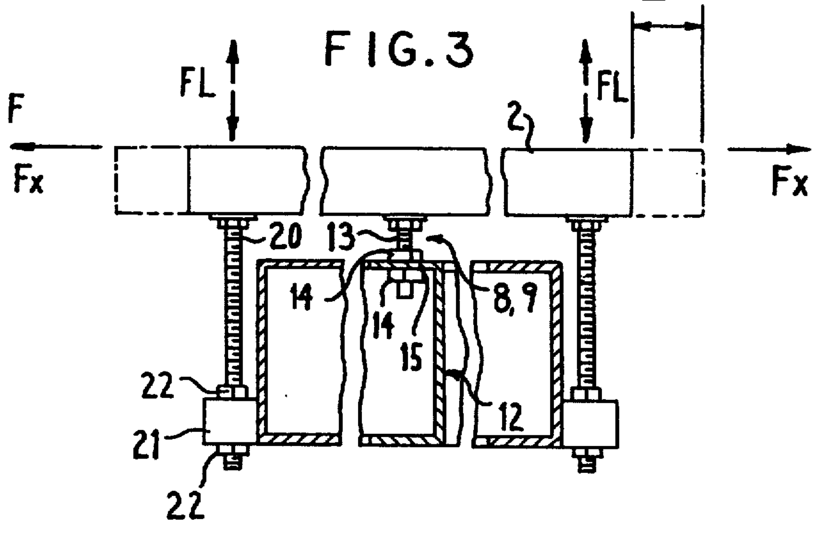
FIG. 3 is a schematic cross-sectional view taken along the line III—III of FIG. 1.

The length and the diameter of the threaded rod 16, 17; 18, 19 is thereby dimensioned such that the expansion in direction Fx (FIG. 3) and F1 due to heat is possible without losing the flatness of the heating surface 5.

More specifically, and as stated above, each loose support or fastening means 16, 17, 18, 19 includes a long rod 20, one end of which is fastened on the heating plate 2 and the other end of which is fastened on a frame holder 21. The long rods 20 have a diameter "d" in the range of M16–M20 (a metric thread dimension) and a free length "H" in the range of 250 mm–400 mm. The rods can yield to the deforming forces caused by the heat expansion at about 180° C. to cause the rectangular heating plate having a thickness dimension "h" of 140 mm and a width dimension "B" of 2600 mm extending transversely to the conveying direction I of the corrugated cardboard web to widen (i.e., in the width direction B) by an amount $\Delta x$ in the range of about 1.7–2 mm, with a corresponding deviation of the heating plate flatness being smaller than about 0.01 mm, so that the demanded flatness of the heating surface is maintained.

The embodiments of the invention in which an exclusive property or privilege is claimed are defined as follows:

1. In a corrugated board plant having a form-stiff fixed frame and a heating device which includes at least one heating plate with a flat heating surface thereon, the improvement comprising:

first support means oriented intermediate opposite ends of said heating plate for securing and supporting said heating plate on said fixed frame and orienting a plane of said flat heating surface at a defined location relative to said frame; and second support means oriented on opposite sides of said first support means and adjacent each of said ends of said heating plate for yieldably securing and supporting said ends of said heating plate on said frame, said second support means yielding to deforming forces caused by heat expansion so as to maintain the flatness of said heating surface on said heating plate and to maintain said plane containing the flat heating surface substantially in said defined location relative to said frame.

2. The invention according to claim 1, wherein each heating plate is fastened at each end on a frame carrier of said fixed frame extending in a central longitudinal plane substantially parallel to said plane of said heating surfaces.

3. The invention according to claim 2, wherein each heating plate is rectangular and supported at each corner by said second support means.

4. The invention according to claim 3, wherein each second support means includes a long rod, one end of which is fastened on the heating plate and the other end of which is fastened on a frame holder secured to said fixed frame, said rod having a length and a cross section dimensioned such that said rod yields to the deforming forces caused by the heat expansion so that the demanded flatness of the heating surface is maintained.

5. The fastening device according to claim 4, wherein each rod is adjustably fastened on the frame holder.

6. The invention according to claim 1, wherein each second support means includes a long rod, one end of which is fastened on the heating plate and the other end of which is fastened on a frame holder secured to said fixed frame, said rod having a length and a cross section dimensioned such that said rod yields to the deforming forces caused by the heat expansion so that the demanded flatness of the heating surface is maintained.

7. The invention according to claim 1, wherein each heating plate is rectangular and is supported at each corner by said second support means.

8. The invention according to claim 1, wherein each second support means includes a long rod, one end of which is fastened on the heating plate and the other end of which is fastened on a frame holder secured to said fixed frame, and wherein the rod used has a threaded portion in the range of M16 to M20 and a free length H in the range of 250 mm to 400 mm, and a heating of the heating plate having a thickness of $h=140$ mm and a width $B=2600$ mm to 180° C. permits an expansion of the heating plate in its widthwise direction Fx by $\Delta x=1.7$ mm–2 mm, with the change of the flatness of the heating plate being $<0.01$ mm.

9. The invention according to claim 1, wherein a plurality of said heating plates are provided which are oriented adjacent to each other, each heating plate being secured to said frame by said first support means oriented intermediate said opposite ends thereof and said second support means oriented on opposite sides of said first support means, said heating surface of each said heating plate being oriented coplanar with each other heating surface in said plane at said defined location relative to said frame.

* * * * *